(12) United States Patent
Maddison

(10) Patent No.: US 7,248,282 B2
(45) Date of Patent: Jul. 24, 2007

(54) MICROSCOPY IMAGING SYSTEM AND METHOD

(75) Inventor: John R Maddison, Tunbridge Wells (GB)

(73) Assignee: Fairfield Imaging Limited, Kent (GB)

( * ) Notice: Subject to any disclaimer, the term of this patent is extended or adjusted under 35 U.S.C. 154(b) by 758 days.

(21) Appl. No.: 10/365,708

(22) Filed: Feb. 12, 2003

(65) Prior Publication Data

US 2003/0214706 A1    Nov. 20, 2003

(30) Foreign Application Priority Data

Feb. 13, 2002    (GB)    ................. 0203406.4

(51) Int. Cl.
*H04N 7/18*    (2006.01)
*G06K 9/00*    (2006.01)

(52) U.S. Cl. ........................................ 348/79; 382/133

(58) Field of Classification Search ................ 348/79, 348/87; 382/133, 255; 250/201.3; 356/39; 359/386

See application file for complete search history.

(56) References Cited

U.S. PATENT DOCUMENTS

| 4,342,905 A | 8/1982 | Fujii et al. |
| 4,661,692 A | 4/1987 | Kawasaki |
| 5,710,662 A | 1/1998 | Nishida |
| 5,719,700 A | 2/1998 | Corcuff et al. |
| 5,801,881 A * | 9/1998 | Lanni et al. ................. 359/386 |
| 5,932,872 A * | 8/1999 | Price ......................... 250/201.3 |
| 6,128,129 A | 10/2000 | Yoneyama |
| 6,259,080 B1 | 7/2001 | Li et al. |
| 6,640,014 B1 * | 10/2003 | Price et al. .................. 382/255 |
| 6,711,283 B1 * | 3/2004 | Soenksen .................... 382/133 |
| 2003/0184730 A1 * | 10/2003 | Price ........................... 356/39 |
| 2005/0031192 A1 | 2/2005 | Sieckmann |

FOREIGN PATENT DOCUMENTS

| EP | 0 155 247 A2 | 9/1985 |
| GB | 2 315 562 A | 2/1998 |
| JP | 60068312 | 4/1985 |

* cited by examiner

*Primary Examiner*—Gims Philippe
(74) *Attorney, Agent, or Firm*—Vierra Magen Marcus & DeNiro LLP

(57) ABSTRACT

A microscopy imaging system and method acquires digital images of a microscope specimen using a computer-controlled microscope and digital camera. A specimen on a microscope slide is placed within the microscope. The method comprises the steps of determining whether an area of the specimen contained within a microscope field of view has a thickness, and, if so, capturing digital images of the field of view at a plurality of depths of focus. In a preferred embodiment, the step of determining whether an area of the specimen contained within a microscope field of view has a thickness comprises the steps of: capturing a digital image of the field of view at two or more depths of focus; comparing the captured digital images, and determining that the specimen has a thickness, if the comparing step finds that the images are different. The method may be implemented in the form of a computer program.

9 Claims, 2 Drawing Sheets

MICROSCOPY IMAGING SYSTEM AND METHOD

PRIORITY CLAIM

The present application claims priority to UK Patent Application No. 02 034 06.4, entitled "Microscopy Imaging System And Method", which application was filed on 13 Feb. 2002.

BACKGROUND OF THE INVENTION

1. Field of the Invention

The present invention relates to a system and method for providing digital images of a microscope specimen, which images can be displayed on a display screen to resemble the images viewed through a microscope.

2. Description of the Related Art

The use of digital images of a microscope specimen, often referred to as "virtual microscope images", is increasingly common in the field of diagnostic pathology, particular for remote diagnosis and training. The digital images of the specimen are typically acquired by "scanning" the specimen using a microscopy imaging system comprising a computer controlled microscope and digital camera, at one or more magnifications/resolutions.

For example, a method of acquiring digital microscope images is disclosed in EP-A-0 994 433 in the name of the present applicant. In this method, a series of adjacent specimen images is acquired from a microscope using a digital camera. In particular, a microscope stage, holding the specimen slide, is advanced in stepwise fashion, under computer control, to position the specimen within the microscope for each captured image, so as to obtain adjacent field of view images of the complete specimen. The image data for the individual, adjacent, field of view images is processed to produce data for an image of the complete specimen for viewing on a display screen.

As disclosed in EP-A-0 994 433, a focusing system including a piezo-electric driver is typically used to adjust the position of the objective lens of the microscope so as to maintain a constant sharp focus for the specimen images during the scan. This ensures that the acquired images, when assembled together, produce a sharp image for the complete specimen, essentially in a single optical plane.

Images of a specimen focused in a single optical plane are sufficient for pathologists to perform diagnosis in cases where the biological specimen is relatively thin and uniform across the sample. However, for certain types of specimen sample, there may be areas where the specimen is thicker and non-uniform. For example, cytology samples may include areas or clumps of overlapping cells. A pathologist viewing such a specimen using a conventional microscope would typically wish to change the focus of the microscope to view such a specimen at different levels, i.e. in different optical planes of the specimen. By adjusting the focus, the pathologist is able to view not only the uppermost cells but also underlying cells within the clump.

As is well known in the art, the ability to achieve sharply focused images at different levels within a specimen (i.e. in different optical planes of an object) is dependent upon the depth of field and the depth of focus of the microscope.

It would be desirable to provide a pathologist with the same ability using virtual microscope images. In particular, it would desirable to provide a pathologist with the ability to view digital microscope images of a specimen at different levels within the specimen.

SUMMARY OF THE INVENTION

Generally, the present invention provides a method for acquiring digital images of a microscope specimen comprising capturing digital images of an area of the specimen contained within a microscope field of view at a plurality of focusing positions.

The digital images captured according to the present invention are thus available so that a pathologist can view images of the specimen at different levels within the specimen.

According to a first aspect, an embodiment of the present invention provides a method for acquiring digital images of a microscope specimen comprising the steps of: determining whether an area of the specimen contained within a microscope field of view has a thickness such that a focused image can be achieved in more than one optical plane, and, if so, capturing digital images of the area of the specimen contained within the microscope field of view at a plurality of focusing positions.

In this way, digital images at different focusing positions are only acquired in areas of the specimen which have a thickness, thus minimising the time for acquiring images of the complete specimen.

In a preferred embodiment, the step of determining whether an area of the specimen contained within a microscope field of view has a thickness such that a focused image can be achieved in more than one optical plane, comprises the steps of: capturing a digital image of the field of view at two or more focusing positions; for each image, determining whether the image is in focus, and if more than one of the images are in focus, determining that the specimen has a thickness.

According to a second aspect, the present invention provides a computer readable medium including a computer program encoded with instructions for carrying out a method in accordance with the present invention.

According to a third aspect, the present invention provides a computer controlled microscopy imaging system configured to carry out a method in accordance with the present invention.

According to a fourth aspect, an embodiment of the present invention provides a microscopy imaging system for acquiring digital images of a microscope specimen, comprising: a microscope; a processor; a camera for capturing digital images of the specimen in a field of view of the microscope, and a focusing controller configured to change the focus of the microscope; wherein the processor is configured to determine whether an area of the specimen contained within the microscope field of view has a thickness such that a focused image can be achieved in more than one optical plane, and to control the camera to capture digital images of the field of view of the microscope at a plurality of focusing positions if it is determined that the area of the specimen has a thickness.

Further preferred features and advantages of the present invention will be apparent from the following description and accompanying claims.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1:
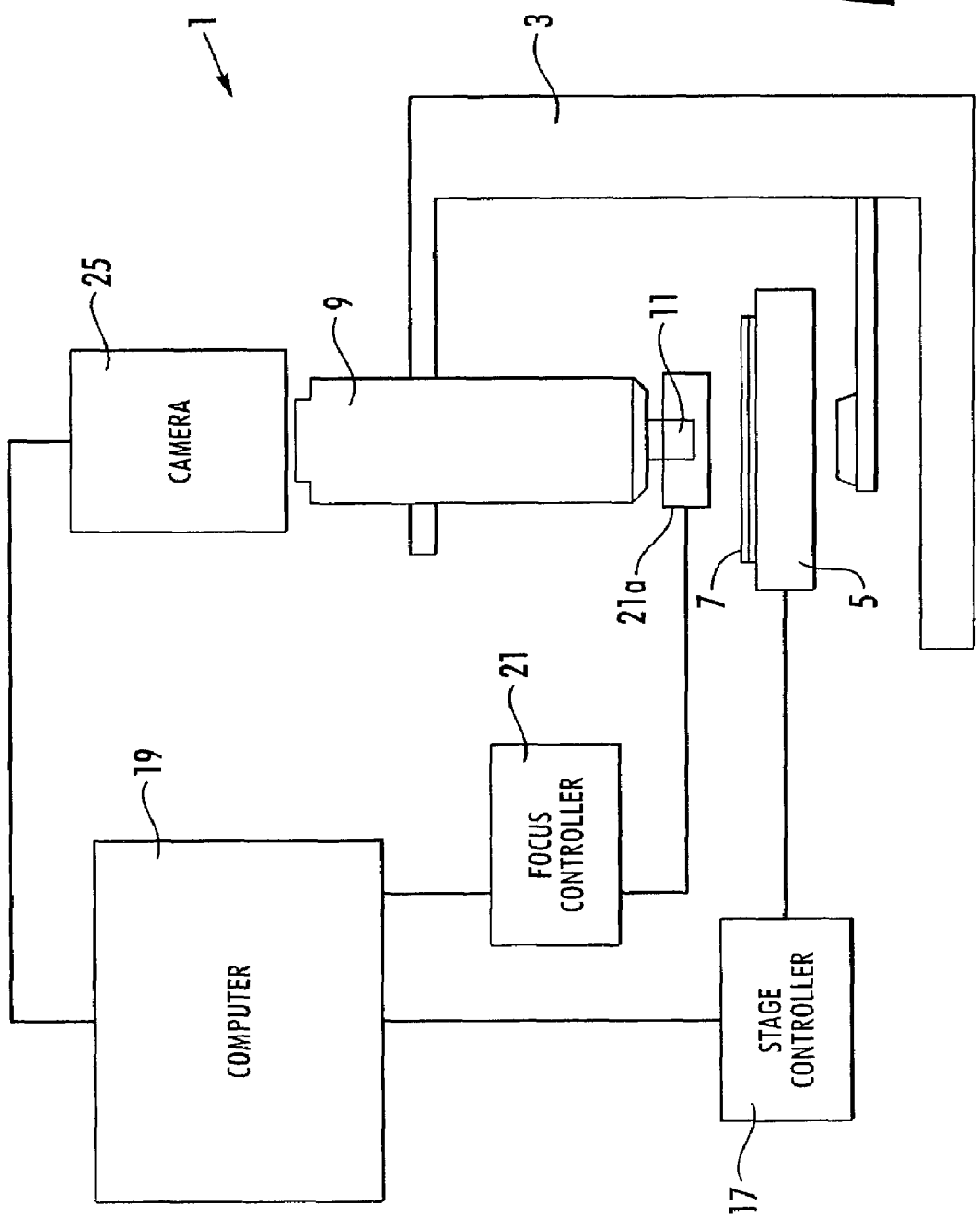
FIG. 1 is a schematic view of a microscopy imaging system which may be employed in accordance with the present invention.

FIG. 1 illustrates a microscopy imaging apparatus 1 for use in accordance with a preferred embodiment of the present invention. The imaging apparatus 1 comprises a microscope 3 having a motorised microscope stage 5 for holding a microscope slide 7, and an objective lens 11. An example of a suitable microscope is the Axioplan 2 imaging microscope available from Carl Zeiss of Germany, using an Apochromat objective lens. The stage may be any suitable motorised stage having the necessary positioning accuracy, for example the Proscan stage available from Prior Scientific Instruments Limited of Cambridge, UK.

The motorised stage 5 is driven under the control of a stage controller 17, which controls the stage in response to instructions from computer 19. The motorised stage 5 is typically driven only in the x- and y-directions. In addition, focusing of the microscope is controlled by a piezo-electric controller 21 which controls a focusing device 21a. The focusing device 21a moves the objective lens 11 towards and away from the slide 7, along the axis of the optical system, to focus the microscope 3, under control of computer 19. A suitable piezo-electric focusing controller 21 is available from Physik Instrumente of Germany.

The imaging apparatus 1 additionally includes a digital camera 25, preferably a high resolution CCD camera. In the preferred embodiment, camera 25 includes a square array of CCD sensors, for example about 1024×1024 pixels and of 24-bit colour. Examples of suitable digital cameras are the X003P Firewire camera available from Sony Corporation and the Hamamatsu Orca C4742SC camera.

The camera 25 is arranged to acquire images from the microscope 3 under control of stage controller 17 and computer 19 and to provide the acquired images to computer 19 for processing, as described below.

Figure 2:
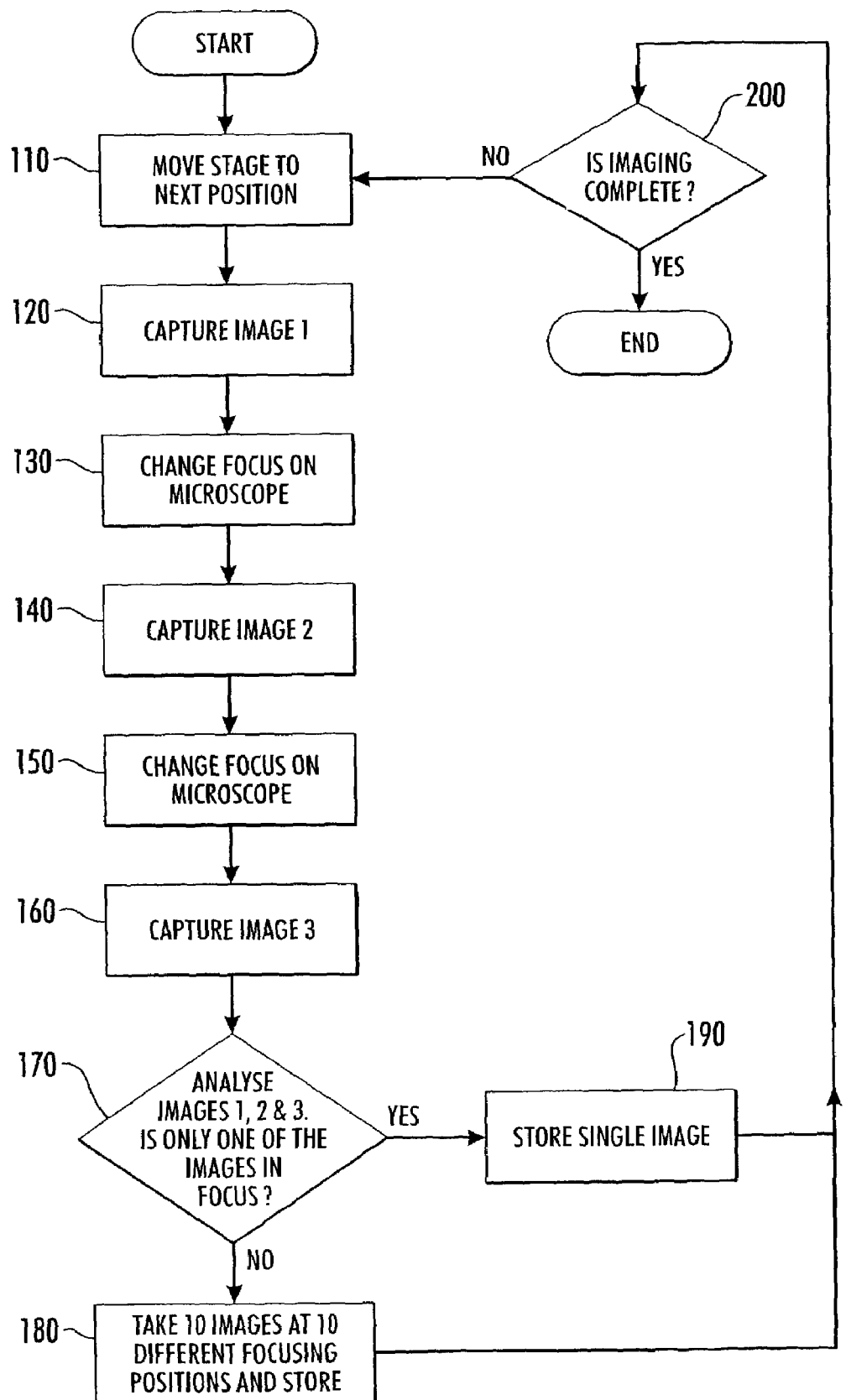
FIG. 2 is a flow diagram showing the steps performed in a method according to a preferred embodiment of the present invention.

FIG. 2 is a flow diagram showing the steps performed by a computer program for operating the imaging apparatus of FIG. 1 to perform a method of imaging a specimen in accordance with a preferred embodiment of the present invention. The computer program typically forms part of one or more software applications running on computer 19 to control the movement of the microscope stage 5 and the operation of camera 25 to acquire images of the specimen, and to perform processing of the acquired images. The computer program may be provided on any computer readable medium such as an optical or magnetic disk, or in the form of a carrier wave, for loading onto computer 19.

Whilst in the preferred embodiment, the method of the present invention is implemented in the form of a computer program, it will be appreciated by the skilled person that the method could be implemented in other forms, including hardware.

As shown in FIG. 2, at step 110, the program begins by moving the microscope stage 5 to position the slide at the starting position of the scan. In accordance with conventional techniques, the scan is performed by acquiring a row of adjacent images, and the starting position is typically the left hand side of a first row of images. Other starting positions are possible.

At step 120, the program operates the camera 25 to capture an image of the specimen from the microscope 3 with the objective lens 11 at a predetermined first focusing position, which may be the normal or default focusing position for the imaging system. The focus may be finely adjusted around the first focusing position, to achieve the best focus (sharpest image), by the focusing device 21a under the control of piezoelectric controller 21 using conventional techniques. The image data for the captured image, "image 1" is stored in the camera 25 or sent to computer 19.

At step 130, the program changes the focus of the microscope 3. In particular, the program instructs the piezoelectric controller 21 to control the focusing device 21a to move the objective lens 11 to a predetermined second focusing position, and many finely adjust the focus around the second focusing position to achieve the best focus.

At step 140, the program operates the camera to capture an image of the specimen from the microscope at the second focusing position. The image data for the captured image "image 2" is stored in the camera 25 or sent to the computer 19. Since the stage is not moved between step 120 and step 140, image 2 is captured from the same position as image 1, and represents the same portion of the specimen.

At step 150, the program again changes the focus of the microscope 3. In particular, the program instructs the piezoelectric controller 21 to control the focusing device 21a to change the focus by moving the objective lens 11 to a predetermined third focusing position, different from the first and second predetermined focusing positions. Again, fine adjustment may be performed to achieve the best focus for the image.

At step 160, the program operates the camera to capture an image of the specimen from the microscope at the third focusing position. The image data for the captured image "image 3" is stored in the camera 25 or sent to the computer 19. Since the stage 5 is not moved between steps 120 and 160, image 3 is captured from the same position as images 1 and 2, and represents the same portion of the specimen.

At step 170 the program retrieves the image data for images 1, 2 and 3, either from camera 25 or from memory associated with computer 19, and for each digital image determines whether the image is sharp and in focus. As the skilled person will appreciate, this can be performed using a suitable algorithm for determining the level of detail contained in the image data. For example, the algorithm may use Fourier analysis to determine the quantity of high frequency information contained in the image data for each image and thus and compare this with a threshold level of such information for a sharp, focused image. Alternatively, or in addition, the algorithm may compare the level of detail contained in the data for the three images 1, 2 and 3 to determine whether they are in focus.

If the image data for only one of the three images is determined to be sharp and in focus, then the portion of the specimen contained in the image is thin and can only be viewed at one level, or in one optical plane. Accordingly, the program continues with step 190 by storing the image data for the image of images 1, 2 and 3 that is in determined to be in focus in memory.

If, on the other hand, the image data for more than one of the three images is determined to be sharp and in focus, then the portion of the specimen contained in the image does have a thickness which enables it to be viewed at more than one level, or in more than one optical plane. Thus, in order to make available to the pathologist image data which enables the portion of the specimen to be viewed at different levels, at step 180 the program continues by controlling the camera 25 and focusing device 21a to capture a plurality of images of the specimen at corresponding pre-selected different focusing positions, and storing the image data in memory. In the illustrated embodiment, the images are acquired at ten different predetermined focusing positions. In the preferred embodiment, the ten focusing positions are regularly spaced, and provide images through the full thickness of the specimen.

After storing the image data for the starting position at step 180 or step 190, the program continues at step 200 by considering whether imaging is complete, that is whether the scan of the specimen is complete. This is determined, for example, by comparing the current coordinates of the stage 5 with the stage coordinates for the finishing position.

If the scan is incomplete (as it is at the starting position) the program continues with step 110 by moving the microscope stage 5 to the next, second position, to capture the next image in the scan, i.e. to a position in order to capture an image adjacent to the previous image. The positioning of the microscope stage 5 during the scan is controlled using conventional techniques well know to the skilled person.

The program then proceeds with steps 120 to 170 at the second position, and stores image data at that position at step 180 or step 190. The scan continues until at step 200 the program determines that imaging is complete, and the program ends.

The image data is processed and stored by computer 19 in memory. In a preferred embodiment, the image data acquired at every stage position for each of the ten preselected depths is stored together so as to provide data for a composite image at each of the ten focusing positions. Thus, the image data can be readily extracted from memory and displayed on the display screen to provide a composite image of the specimen at different depths of focus. For portions of the specimen having insufficient thickness for multiple images to be acquired, the image data at the single focusing position is utilised.

Whilst in the preferred embodiment, illustrated in FIG. 2, steps 120 to 170 are utilised to determine, at each stage position, whether the area of the specimen contained within the microscope field of view has a thickness such that a focused image can be achieved in more than one optical plane, these steps are not essential. For example, the pathologist may manually look at the specimen and determine that the complete specimen requires imaging at a plurality of different focusing positions, so that only program steps 110, 180 and 200 are necessary. However, for specimens in which only certain areas have a thickness (e.g. due to clumps of cells) the preferred embodiment is useful in minimising the time taken to acquire images of the complete specimen.

In all embodiments, the present invention enables the user to display images of a portion of the specimen having a thickness at different levels within the specimen.

As the skilled person will appreciate, various modifications and changes may be made to the described embodiments.

For example, whilst the preferred embodiment captures images at ten different focusing positions, the number of focusing positions is arbitrary, being dependent upon the thickness of the specimen, but is typically in the range of 5 to 20. In addition, whilst the preferred embodiment uses three images, at different focusing positions, to determine whether the imaged portion of the specimen has a thickness, in other embodiments two, or four images may be used. The focusing positions utilised for image acquisition may be user adjusted or intelligently adjusted according to the image data acquired, the nature of the sample and other relevant factors.

The present invention is not limited to the use with the described imaging equipment, or for any particular types of specimen.

It is intended to include all such variations, modifications and equivalents which fall within the spirit and scope of the present invention.

The invention claimed is:

1. A method for acquiring digital images of a microscope specimen using an automated microscopy image scanning system comprising the steps of:
   determining whether an area of the specimen contained within a microscope field of view has a thickness such that a focused image can be achieved by capturing images in more than one optical plane perpendicular to an optical axis of the image scanning system;
   capturing digital images of the area of the specimen contained within the microscope field of view using a single digital camera at a plurality of focusing positions if the area has said thickness;
   capturing at least one digital images of the area of the specimen contained within the microscope field of view using the single digital camera at a single focusing position if the area does not have said thickness; and
   moving to a different area of the specimen by scanning the microscope field of view in an optical plane perpendicular to the optical axis of the image scanning system; and
   repeating the determining and capturing steps.

2. A method as claimed in claim 1, wherein the plurality of focusing positions is in the range 5 to 20.

3. A method as claimed in claim 1, in which the step of determining whether an area of the specimen contained within a microscope field of view has a thickness comprises the steps of:
   capturing a digital image of the field of view using the single digital camera at two or more focusing positions;
   determining whether more than one of the captured digital images is in focus, and
   determining that the specimen has a thickness, if it is determined that more that one of the captured digital images is in focus.

4. A method as claimed in claim 3, wherein the step of determining whether one or more of the captured images is in focus comprises analysing data for the digital images to determine whether image information therein is consistent with a focused image.

5. A method as claimed in claim 3, wherein the step of capturing a digital image of the field of view at two or more focusing positions, comprises capturing a first digital image using the single digital camera; changing the focus of the microscope using a piezo-electric controller, and capturing a second digital image using the single digital camera.

6. A computer readable medium including a computer program encoded with instructions for carrying out a method for acquiring digital images of a microscope specimen using an automated microscopy image scanning system comprising the steps of:
   determining whether an area of the specimen contained within a microscope field of view has a thickness such that a focused image can be achieved by capturing images in more than one optical plane perpendicular to an optical axis of the image scanning system;
   capturing digital images of the area of the specimen contained within the microscope field of view using a single digital camera at a plurality of focusing positions if the area has said thickness;

capturing at least one digital images of the area of the specimen contained within the microscope field of view using the single digital camera at a single focusing position if the area does not have said thickness; and deciding whether the image capturing steps are complete, and if not, moving to a different area of the specimen by scanning the microscope field of view in an optical plane perpendicular to the optical axis of the image scanning system; and repeating the determining and capturing steps.

7. A computer readable medium including a computer program encoded with instructions for carrying out a method for acquiring digital images of a microscope specimen using an automated microscopy image scanning system, the program comprising:

a program step for determining whether an area of the specimen contained within a microscope field of view has a thickness such that a focused image can be achieved by capturing images in more than one optical plane perpendicular to an optical axis of the image scanning system;

a program step for capturing digital images of the area of the specimen contained within the microscope field of view using a single digital camera at a plurality of focusing positions, if it is determined that the area of the specimen contained within the field of view has said thickness;

a program step for capturing at least one digital images of the area of the specimen contained within the microscope field of view using the single digital camera at a single focusing position, if it is determined that the area of the specimen contained within the field of view does not have said thickness;

a program step for deciding whether the image capturing program steps are complete, and if not:

a program step for moving to a different area of the specimen by scanning the microscope field of view in an optical plane perpendicular to the optical axis of the image scanning system; and a program step for repeating the determining and capturing program steps.

8. A computer controlled microscopy imaging system configured to carry out a method for acquiring digital images of a microscope specimen comprising the steps of:

determining whether an area of the specimen contained within a microscope field of view has a thickness such that a focused image can be achieved by capturing images in more than one optical plane perpendicular to an optical axis of the image scanning system;

capturing digital images of the area of the specimen contained within the microscope field of view using a single digital camera at a plurality of focusing positions if the area has said thickness;

capturing at least one digital images of the area of the specimen contained within the microscope field of view using the single digital camera at a single focusing position if the area does not have said thickness; and deciding whether the image capturing steps are complete, and if not, moving to a different area of the specimen by scanning the microscope field of view in an optical plane perpendicular to the optical axis of the image scanning system; and repeating the determining and capturing steps.

9. A microscopy imaging system for acquiring digital images of a microscope specimen, comprising a microscope; a processor; a single digital camera for capturing digital images of the specimen in a field of view of the microscope, and a focusing controller configured to change the focus of the microscope; wherein the processor is configured to (a) determine whether an area of the specimen contained within the microscope field of view has a thickness such that a focused image can be achieved in more than one optical plane, (b) control the camera to capture digital images of the field of view of the microscope at a plurality of focusing positions if it is determined that the area of the specimen has said thickness, (c) control the camera to capture at least one digital images of the field of view of the microscope at a single focusing position if it is determined that the area of the specimen does not have said thickness, (d) move the microscope to a different area of the specimen, and (e) capture additional images until image acquisition is complete.

* * * * *